United States Patent [19]

Overton et al.

[11] Patent Number: 5,647,884
[45] Date of Patent: Jul. 15, 1997

[54] APPARATUS FOR REDUCING DEFORMATION OF A COATING ON A COATED OPTICAL FIBER

[75] Inventors: Bob J. Overton, Lenoir, N.C.; Robert L. Roach, Sturbridge, Mass.; Adolphe R. Lopez, Denver, N.C.

[73] Assignee: Alcatel NA Cable Systems, Inc., Claremont, N.C.

[21] Appl. No.: 588,974

[22] Filed: Jan. 19, 1996

[51] Int. Cl.⁶ .................. C03B 7/01; C03B 37/02; C03C 25/02; B29C 47/34; B29C 55/00

[52] U.S. Cl. .................. 65/533; 65/432; 65/435; 425/66; 264/27

[58] Field of Search .................. 65/377, 475, 477, 65/529, 533, 535, 432, 435; 425/66, 76, 131.5; 264/1.28, 1.29, 2.7

[56] References Cited

U.S. PATENT DOCUMENTS

| | | | |
|---|---|---|---|
| 3,243,339 | 3/1966 | Scragg et al. | 425/76 |
| 4,331,463 | 5/1982 | Briere et al. | 65/13 |
| 4,874,415 | 10/1989 | Boniort et al. | 65/432 |
| 5,178,313 | 1/1993 | LeCompte et al. | 226/95 |
| 5,314,519 | 5/1994 | Petisce | 650/3.11 |
| 5,316,562 | 5/1994 | Smithgall et al. | 650/3.11 |
| 5,449,393 | 9/1995 | Tsuneishi et al. | 65/377 |

Primary Examiner—Donald E. Czaja
Assistant Examiner—Jacqueline A. Ruller
Attorney, Agent, or Firm—Ware, Fressola, Van Der Sluys & Adolphson LLP

[57] ABSTRACT

A capstan belt (80) is mounted on a pair of pulleys (82,83) for engagement with the surface of a draw capstan (75), the capstan belt (80) being driven for rotation on the pair of pulleys (82,83) by rotational movement of the capstan (75). A coated optical fiber (35) is drawn between the capstan (75) and the capstan belt (80). At least a surface of the capstan belt (80) is manufactured of a very low modulus material which easily deforms when contacting the coated optical fiber (35) such that the belt material deforms rather than the coating on the fiber during contact between the belt and the coated fiber. An idler belt (78) may surround the capstan (75) and an idler pulley (79), at least the surface of the idler belt (78) being manufactured of the same or similar material as the capstan belt (80). The belt material has a modulus of elasticity in the range of 10 to 200 PSI (0.07 to 1.38 MPa) at 10% strain and 200 to 5000 PSI (1.38 to 34.5 MPa) at 100% strain. Additionally, the abrasion resistance of the belt material when tested in accordance with ASTM C501 (1.000 cycles at 1,000 gram load) is in the range of 10 to 200. The tear properties of the belt material (as measured in accordance with ASTM D 624 die C) are in the range of 100 to 1000 lb/linear inch (1.75×104 to 1.75×105 nt/m). The compression properties of the belt material in accordance with ASTM D395 are in the range of 1 to 20% (set, method A) or in the range of 5 to 50% (set, method B).

16 Claims, 2 Drawing Sheets

APPARATUS FOR REDUCING DEFORMATION OF A COATING ON A COATED OPTICAL FIBER

TECHNICAL FIELD

The present invention relates to the production of low loss optical fiber and, more particularly, to a method and apparatus for reducing deformation in the coating of a coated optical fiber after drawing of the optical fiber from a preform.

BACKGROUND OF THE INVENTION

Optical fibers are normally made in a process which involves drawing a thin glass strand or fiber from a partially molten glass preform, and thereafter coating the strand of fiber with a polymer to preserve its structural strength. The composition of the preform will largely depend upon the type of optical fiber desired (single mode, multimode, dispersion shifted, etc.)

Glass is an amorphous material, which can be brought to a low viscosity condition by heating. With a quartz glass preform normally used to manufacture optical fibers, a significant softening of the glass occurs at a glass softening temperature of about 1900°to 2200° K. Glass softening at the glass softening temperature is employed to enable the drawing of the preform into a thin glass fiber. To that end, the preform is heated in a drawing oven (furnace), which can be a graphite resistance furnace wherein a heating element is brought to the glass softening temperature by pulsating direct or alternating current. Alternatively, an induction furnace may be used wherein a tube, made of zirconium oxide or graphite, is brought to the glass softening temperature by an electro magnetic field.

The production of optical fibers typically occurs on what is known as a drawing tower, which is a vertically oriented production device for manufacturing optical fibers. The furnace is located at the top of the drawing tower for heating the glass preform, and the strand or fiber drawn from the preform passes through various measuring, cooling, coating and curing stages prior to passing through a tensioning and drawing device located at the bottom of the drawing tower. The tensioning and drawing device is typically a capstan arrangement wherein the optical fiber is fed off to a take up spool.

The heat of the furnace and the rate of draw of the fiber must be in proper balance so that the fiber can be drawn continuously with a uniformity of desired properties. This balance is normally accomplished by monitoring the tension of the coated fiber while drawing the fiber at a uniform rate, typically between 1 and 10 meters per second. If the coated fiber tension rises above a prescribed value, the heat of the furnace is typically raised which results in a reduced tension. Similarly, the furnace temperature is lowered in response to the tension falling below a prescribed range of values. It is also known to control the fiber tension by controlling the draw speed. For example, if the tension of the coated fiber is too low, the draw speed may be increased to increase the fiber tension. If the tension in the fiber is above a prescribed range of values, the fiber draw speed may be reduced to thereby reduce fiber tension.

One known drawing mechanism is a capstan mechanism which includes a pair of capstan wheels held in fixed position with respect to one another wherein the fiber is fed between the capstan wheels. One or both of the capstan wheels may be coated for example with a rubber coating, to firmly grip the fiber. Another known capstan arrangement includes a motor driven wheel of, for example, 30 centimeter diameter, against which the coated optical fiber is pressed by a capstan belt. The fiber may contact the surface of the capstan over a portion of the circumference equal to, for example, 90° (1.6 radians). After the capstan, the fiber may pass over one or more pulleys before being wound onto a take up spool. The capstan belt serves to insure sufficient contact between the fiber and the draw capstan such that the fiber does not slip against the capstan and such that the capstan completely controls the speed of the fiber throughout the process. Therefore, there is a significant pressure placed by the capstan belt on the fiber against the capstan wheel. In the industry today, capstan belts are typically fiber re-enforced hard rubber, or may be tough woven fabric with a significant weave pattern, pressing against the fiber as it passes through the capstan. These materials ensure good wear and long service life of the belt.

It has been found that when utilizing higher draw speeds, the fiber coatings are still at a relatively high temperature (up to 100° C. or higher) when the fiber enters the capstan. When a pair of capstan wheels are used to draw a coated fiber by passing the coated fiber between the capstan wheels, the coated fiber is "pinched" resulting in deformation of the fiber coating in pressing it against the capstan wheel. Similarly, in the single capstan and belt arrangement, the hard rubber or woven capstan belts deform the fiber coating in pressing it against the capstan wheel. At the same time, the coating is cooled through contact with the steel capstan to below its glass transition temperature, thereby freezing the deformation into the coating. The deformation in the coating translates to an inhomogeneous stress distribution on the glass fiber which results in microbending-induced added loss. With time, the deformation relaxes out of the secondary coating to some extent which reduces the added loss. However, the degree of added loss reduction is variable with permanent added loss observed up to 0.1 dB/KM in some cases. Therefore, a need exists in the art for a method and apparatus for drawing an optical fiber which minimizes deformation of the fiber coating during fiber drawing.

SUMMARY OF THE INVENTION

Objects of the invention include the provision of an improved method and apparatus for drawing a coated optical fiber which minimizes deformation of the coating on the optical fiber, thereby resulting in an improved optical fiber having reduced attenuation.

According to the present invention, a capstan belt is mounted on a pair of pulleys for engagement with the surface of a draw capstan, the capstan belt being driven for rotation on the pair of pulleys by rotational movement of the capstan, and a mated optical fiber is drawn between the capstan and the capstan belt. The capstan belt is manufactured of a very low modulus material which easily deforms when contacting the coated optical fiber such that the belt material deforms rather than the coating on the fiber during contact between the belt and the coated fiber.

In further accord with the present invention, an idler belt is added around the capstan, the idler belt being manufactured of the same or similar material as the capstan belt such that the fiber contacts only the belts and not the metal surface of the capstan.

In further accord with the present invention, the belts are manufactured of a material having a modulus of elasticity in the range of 10 to 200 PSI (0.07 to 1.38 MPa) at 10% strain and 200 to 5000 PSI (1.38 to 34.5 MPa) at 100% strain.

Additionally, the abrasion resistance of the belt material when tested in accordance with ASTM C501 (1,000 cycles at 1,000 gram load) is in the range of 10 to 200.

In still further accord with the present invention, the tear properties of the belt material (as measured in accordance with ASTM D 624 die C) is in the range of 100 to 1000 lb/linear inch ($1.75 \times 10^4$ to $1.75 \times 10^5$ nt/m).

According further to the present invention, the compression properties of the belt material in accordance with ASTM D395 is in the range of 1 to 20% (set, method A) or in the range of 5 to 50% (set, method B). When tested in accordance with Durometer Shore A, the belt material exhibits a Shore A number in the range of 50 TO 90.

According still further to the present invention, suitable belt materials include polyesters, thermoset polyurethanes, block copolymer rubbers, or other material having the desired physical properties to minimize deformation of the coating on the optical fiber.

In accordance with another embodiment of the invention, a fiber-reinforced or hard rubber type belt may be coated with a softer, polymeric material such as the low modulus material described above.

The present invention provides a significant improvement over the prior art by providing a method and apparatus for producing an optical fiber having superior properties and in particular, reduced attenuation due to permanent deformation of the coating on the optical fiber. The present invention accomplishes this goal by providing a capstan belt for a draw capstan which is made of a very low modulus of elasticity material such that the belt material deforms rather than the coated optical fiber when the belt contacts the coated optical fiber. The properties of the optical fiber may be further enhanced by providing an idler belt around the draw capstan also made of a very low modulus of elasticity material. The present invention minimizes deformation of the coatings on an optical fiber, thereby minimizing added losses in the optical fiber due to microbending caused by permanent deformation of the coatings on the optical fiber.

The foregoing and other objects, features and advantages of the present invention will become more apparent in light of the following detailed description of exemplary embodiments thereof, as illustrated in the accompanying drawings.

DETAILED DESCRIPTION OF THE INVENTION

Figure 1:
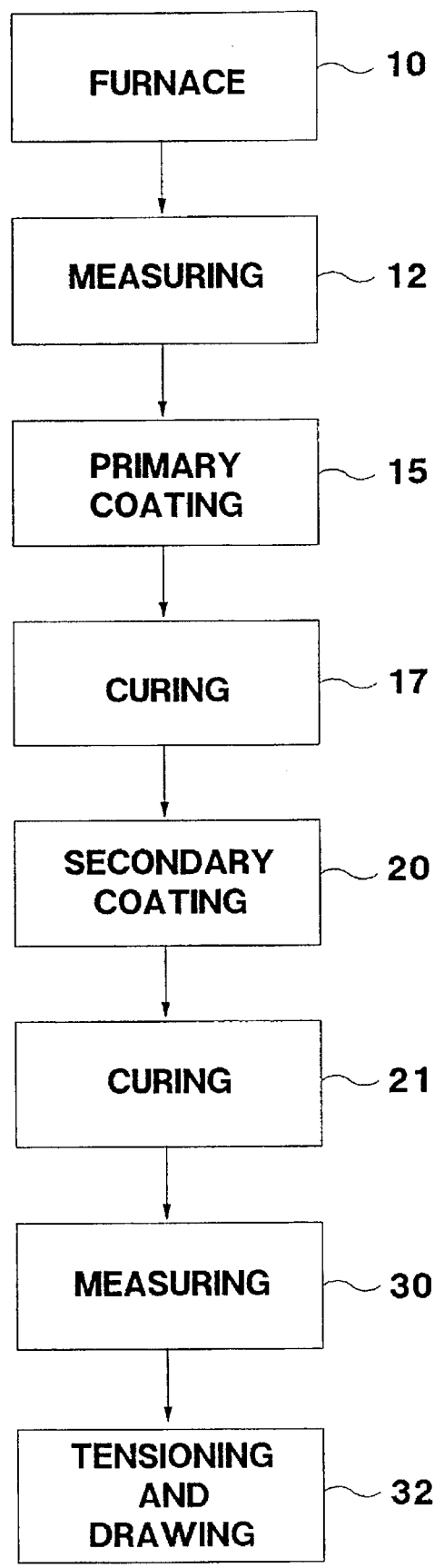
FIG. 1 is a schematic block diagram of a draw tower used to produce an optical fiber in accordance with the present invention.

Referring to FIG. 1, a schematic block diagram showing a typical draw tower is provided. The draw tower is usually a vertical arrangement wherein a preform (not shown) is introduced into a furnace 10 such that an optical fiber can be drawn from a heated end of the preform. After exiting the furnace, the optical fiber may be passed through measuring devices 12 which may measure the diameter and the tension of the optical fiber being drawn from the preform. Next the optical fiber passes through a primary coating apparatus 15, such as a coating die, wherein a coating is applied to the optical fiber. The coating may be a UV curable or heat curable coating, or other suitable coating for providing the desired mechanical properties to the surface of the optical fiber. After exiting the primary mating device 15, the optical fiber enters a curing stage 17 wherein the primary coating is at least partially cured. For example, if the primary coating is a UV curable coating, the curing stage 15 includes a UV light source for exposing the primary coating to UV light for curing the primary coating.

After exiting the curing stage 17, the coated optical fiber may be provided to additional coating and curing stages 20, 21 respectively wherein one or more secondary coatings are added to the fiber. After the final cure stage, the coated optical fiber may be passed through a measuring device 30 wherein the final outside diameter of the coated optical fiber is measured. Finally, the coated optical fiber is provided to a tensioning and drawing device 32 wherein the coated optical fiber is drawn out of the drawing tower and provided to a take up spool (not shown). The coated optical fiber may pass over one or more pulleys before being provided to the take up spool.

Figure 2:
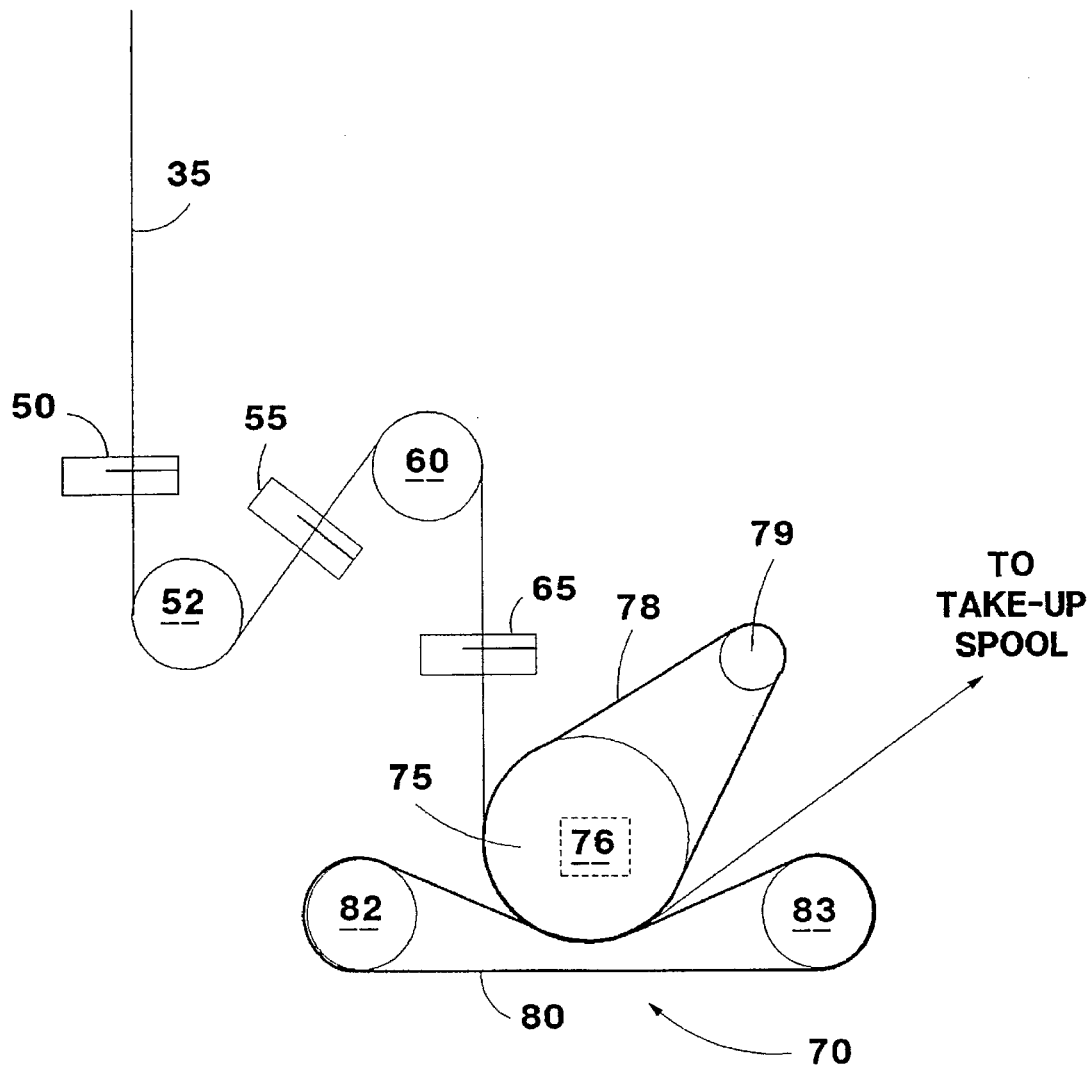
FIG. 2 is a schematic diagram showing the modified draw capstan of the invention including very low modulus of elasticity belts for minimizing deformation of a coating of an optical fiber.

The tension and drawing device 32 of FIG. 1 is shown is greater detail in FIG. 2. Referring to FIG. 2, the coated optical fiber 35 may first be provided to a fiber guide 50 which guides the drawn optical fiber to an idler pulley 52. After the idler pulley 52, the coated optical fiber passes through a second fiber guide 55 and then over a tension or load cell 60. As is known in the art, the tension or load cell 60 may be instrumented as a controller to provide the desired tension on the coated optical fiber 35.

Next, the coated optical fiber 35 is passed through a third fiber guide 65 prior to being provided to a draw capstan arrangement 70. The draw capstan arrangement 70 includes a capstan 75 which is driven, for example by a variable speed drive motor 76 (shown in phantom), to draw the coated optical fiber from the drawing tower at a desired drawing speed. An idler belt 78 surrounds the capstan 75, and the tension of the idler belt 78 on the capstan 75 is controlled by an adjustable idler wheel or pulley 79. For example, the tension of idler wheel 79 on the capstan belt 78 may be controlled by an adjustable spring force. A capstan belt 80 is received over a pair of pulleys 82, 83. The capstan belt 80 comes in contact with the idler belt 78. The capstan belt 80 is driven to rotate on the pulleys 82, 83 by frictional contact with the idler belt 78, which is driven by the capstan 75. The tension of the capstan belt 80 is maintained by one or both of the pulleys 82, 83. For example, one of the pulleys 82, 83 may be in a fixed position for rotation about a fixed axis, while the other pulley is spring loaded by a not shown adjustable spring loading device for maintaining the capstan belt tension. Alternatively, both of the pulleys 82, 83 may be spring loaded.

Although the pulleys 82, 83 and 79 are described herein as being spring loaded for maintaining tension of the capstan belt 80 and idler belt 78, any suitable means of adjusting the tension may be used in accordance with the present invention, such as pneumatic or hydraulic loading.

The coated optical fiber 35 exiting the third fiber guide 65 comes in contact with the idler belt 78 and then is drawn between the capstan belt 80 and the idler belt 78 at the fiber draw speed controlled by the rotational speed of the capstan 75. The speed of the capstan belt 80 is controlled completely by the speed of rotation of the capstan 75. The coated optical fiber 35 is then fed via not shown pulleys on to a take up spool.

In accordance with the present invention, the idler belt 78 and capstan belt 80 are made of a low modulus of elasticity material such that the belts deform when they come in contact with the coated optical fiber. As is know in the art, the coated optical fiber is at an elevated temperature, which may be above the glass transition temperature of the coating. Therefore, when the coating comes in contact with a hard surface it may deform. This deformation may be "frozen" into the coating when it cools. This deformation causes microbending of the optical fiber, thereby causing attenuation in the optical fiber. Therefore, the belt material of the capstan belt 80 and the idler belt 78 is selected to be of a lower modulus of elasticity material than the heated coating material such that the belt material will deform rather than the coating material when the coated optical fiber comes in contact with the belts. It is also important that the other mechanical properties of the belt be selected to prevent deformation of the coating on the optical fiber while at the same time providing a relatively long life in service. In accordance with the present invention, the suitable belt materials will have properties in the ranges as indicated in TABLE I below:

TABLE I

| PROPERTY | RANGE |
| --- | --- |
| MODULUS OF ELASTICITY (@ 10% STRAIN) | 10 TO 200 PSI |
| MODULUS OF ELASTICITY (@ 100% STRAIN) | 200 TO 5000 PSI |
| ABRASION RESISTANCE (ASTM C501, 1000 CYCLES @ 1000 GRAM LOAD) | 10 TO 200 |
| TEAR PROPERTIES (ASTM D 624 die C) | 100 TO 1000 LBS/LINEAR INCH |
| COMPRESSION PROPERTIES (SET, METHOD A, ASTM D395) | 1 TO 20% |
| COMPRESSION PROPERTIES (SET, METHOD B, ASTM D395) | 5 TO 50% |
| DUROMETER SHORE A | 50 TO 90 |

One suitable belt material found to work satisfactory in accordance with the present invention is polyurethane. In particular, a polyurethane belt material was selected having a modulus of elasticity of 30 PSI at 10% strain and 800 PSI at 100% strain. Additionally, the polyurethane belt material had an abrasion resistance of 70 (ASTM C501, 1,000 cycles at 1,000 gram load). The tear properties of the polyester material were 425 pound/linear inch (ASTM D 524 die C). The compression properties of the polyurethane material was 11% in accordance with method A ASTM D395 and 18% in accordance with method B ASTM D395. When tested in accordance with Durometer Shore A, the polyurethane material exhibits a Shore A number of 85.

It is believed that other suitable materials may be used for the belt material provided that these materials have the desired elasticity and compression properties such that the belt material will deform rather than the coating material on the heated optical fiber when the coated optical fiber comes in contact with the belt material. Other suitable belt materials include polyesters or block copolymer rubbers, etc.

Although the invention was described and illustrated with several coating layers applied to the optical fiber, it is known in the art that one or more coating layers may be applied for providing the desired properties of the completed optical fiber. Additionally, although the invention is described herein with respect to FIG. 2 as providing 2 belts, i.e., an idler belt and a capstan belt, significant improvements in the characteristics of a drawn coated optical fiber may be achieved by simply using a capstan belt made of a low modulus of elasticity material in accordance with the present invention.

Figure 3:
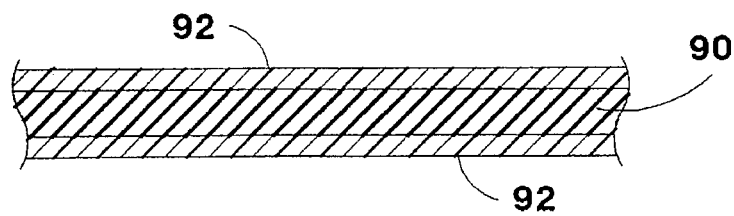
FIG. 3 is a cross-sectional view of a belt in accordance with a second embodiment of the invention.

The invention has been described thus far as using a capstan belt 80 and an idler belt 78 completely made of a low modulus material. However, in accordance with the present invention, a prior art reinforced belt coated with a low modulus material may also be used. Referring to FIG. 3, a cross-sectional view of a reinforced belt is shown having a core 90 made of a fiber re-enforced hard rubber or woven fabric material. Surrounding the core 90 is another layer 92 of low-modulus material. The low modulus material may be of the same type as described hereinabove. Using this embodiment of the invention, the thickness of the outer layer 92 is selected such that the outer layer 92 deforms rather than the fiber coating when the coated fiber passes through a capstan arrangement.

Although the invention has been described and illustrated with respect to exemplary embodiments thereof, the foregoing and other objects, features and advantages of the present invention may be provided therein and thereto without departing from the spirit and scope of the present invention.

We claim:

1. An apparatus for drawing a coated optical fiber from a drawing tower, the coated optical fiber including a central fiber surrounded by at least one layer of protective coating material, the coating material being at an elevated temperature greater than ambient temperature, said apparatus comprising:

a rotating draw capstan having a cylindrical drawing surface; and a capstan belt mounted on one or more capstan belt pulleys with a surface of said capstan belt in engagement with said surface of said draw capstan, said capstan belt being driven for rotation on said one or more capstan belt pulleys by rotational movement of said draw capstan;

wherein the coated optical fiber is drawn between said draw capstan and said capstan belt surface, and wherein at least said surface of said capstan belt is manufactured of a belt material having a lower modulus of elasticity than the coating material on the coated optical fiber when the coating material is at said elevated temperature, such that during contact of said capstan belt surface with the coating material, said capstan belt surface will deform rather than the coating material.

2. An apparatus according to claim 1, further comprising an idler belt received over said capstan, and wherein said coated optical fiber is drawn between said capstan belt surface and a surface of said idler belt, wherein at least said idler belt surface is manufactured of said belt material such that during contact of said idler belt surface with the coating material, said idler belt surface will deform rather than the coating material.

3. An apparatus according to claim 2, wherein the modulus of elasticity of said belt material is in the range of 10 to 200 PSI (0.07 to 1.38 MPa) at 10% strain.

4. An apparatus according to claim 3, wherein the modulus of elasticity of said belt material is in the range of 200 to 5000 PSI (1.38 to 34.5 MPa) at 100% strain.

5. An apparatus according to claim 4, wherein the abrasion resistance of said belt material is in the range of 10 to 200.

6. An apparatus according to claim 5, wherein the tear properties of said belt material are in the range of 100 to 1000 lb/linear inch ($1.75 \times 10^4$ to $1.75 \times 10^5$ nt/m).

7. An apparatus according to claim 6, wherein the compression properties of said belt material are in the range of 1 to 50%.

8. An apparatus according to claim 7, wherein said belt material exhibits a Durometer Shore A number in the range of 50 to 90.

9. An apparatus according to claim 2, wherein said capstan belt and said idler belt are completely manufactured from said belt material.

10. An apparatus according to claim 2, wherein said capstan belt and said idler belt each include a core of a high strength core material and an outer layer of said belt material.

11. An apparatus according to claim 10, wherein said core material is selected from the group consisting of fiber reenforced hard rubber and woven fabric material.

12. An apparatus according to claim 2, wherein said belt material is selected from the group consisting of polyesters, thermoset polyurethanes and block copolymer rubbers.

13. An apparatus according to claim 1, wherein said one or more capstan belt pulleys includes a pair of capstan belt pulleys, said pair of capstan belt pulleys being spaced apart and said capstan belt contacting said capstan between said pair of capstan belt pulleys.

14. An apparatus according to claim 2, wherein said one or more capstan belt pulleys includes a pair of capstan belt pulleys, said pair of capstan belt pulleys being spaced apart and said capstan belt contacting said capstan between said pair of capstan belt pulleys.

15. An apparatus according to claim 2, further comprising an idler pulley spaced apart from said capstan, said idler belt being received over said capstan and said idler pulley.

16. An apparatus according to claim 15, wherein said one or more capstan belt pulleys includes a pair of capstan belt pulleys, said pair of capstan belt pulleys being spaced apart and said capstan belt contacting said capstan between said pair of capstan belt pulleys.

* * * * *

UNITED STATES PATENT AND TRADEMARK OFFICE
CERTIFICATE OF CORRECTION

PATENT NO. : 5,647,884
DATED : July 15, 1997
INVENTOR(S) : Overton et al.

It is certified that error appears in the above-identified patent and that said Letters Patent is hereby corrected as shown below:

In Abstract of patent, line 22 reads "1000 lb/linear inch (1.75 x 104 to 1.75 x 105 nt/m)."

should read -- "1000 lb/linear inch (1.75 x $10^4$ to 1.75 x $10^5$ nt/m)--.

Signed and Sealed this

Sixteenth Day of September, 1997

Attest:

BRUCE LEHMAN

Attesting Officer

Commissioner of Patents and Trademarks